United States Patent [19]

Adamson et al.

[11] Patent Number: 5,305,359

[45] Date of Patent: Apr. 19, 1994

[54] DIMENSIONALLY STABLE AND CORROSION-RESISTANT FUEL CHANNELS AND RELATED METHOD OF MANUFACTURE

[75] Inventors: Ronald B. Adamson, Fremont, Calif.; Donald C. Bartosik, Wilmington, N.C.; Eric B. Johansson, Wrightsville Beach, N.C.; Cedric D. Williams, Wilmington, N.C.

[73] Assignee: General Electric Company, San Jose, Calif.

[21] Appl. No.: 60,668

[22] Filed: May 13, 1993

[51] Int. Cl.⁵ .......................................... G21C 21/00
[52] U.S. Cl. ................................. 376/260; 148/421; 148/672; 72/370
[58] Field of Search ................. 376/260, 463, 900; 148/421, 672; 72/342.1, 342.7, 364, 370

[56] References Cited

U.S. PATENT DOCUMENTS

| | | | |
|---|---|---|---|
| 3,865,635 | 2/1975 | Hofvenstam et al. | 148/672 |
| 3,986,654 | 10/1976 | Hart et al. | 72/370 |
| 4,238,251 | 2/1980 | Williams et al. | 148/672 |
| 4,450,016 | 5/1984 | Vesterlund et al. | 376/260 |
| 4,450,020 | 5/1984 | Vesterlund | 148/672 |
| 4,604,785 | 8/1986 | Eddens | 72/370 |
| 4,649,023 | 3/1987 | Sabol et al. | 148/421 |
| 4,749,543 | 6/1988 | Crowther et al. | 376/443 |
| 4,749,544 | 6/1988 | Crowther et al. | 376/443 |
| 4,989,433 | 2/1991 | Harmon et al. | 376/260 |
| 5,027,635 | 7/1991 | Wilks | 72/342.7 |

FOREIGN PATENT DOCUMENTS 1537930 1/1979 United Kingdom .

*Primary Examiner*—Daniel D. Wasil
*Attorney, Agent, or Firm*—J. S. Beulick

[57] ABSTRACT

A method of manufacturing components made of zirconium-based alloy by combining heat treatment with thermal sizing. The heat treatment includes heating the component to a temperature which initiates the transformation from a hexagonal close-packed crystallographic phase of uniform texture to a body-centered cubic crystallographic phase and then quenching to a quench temperature at a rate which initiates transformation to a hexagonal close-packed crystallographic phase having a texture factor $f_L = 0.28$–$0.38$. The thermal sizing includes heating the component to a temperature less than the quench temperature, but sufficient to anneal the component, and then cooling. Preferably, the thermal sizing is performed twice: before and after the heat treatment.

20 Claims, No Drawings

DIMENSIONALLY STABLE AND CORROSION-RESISTANT FUEL CHANNELS AND RELATED METHOD OF MANUFACTURE

FIELD OF THE INVENTION

This invention generally relates to a method for manufacturing hollow, thin-walled, precisely dimensioned components for use in a nuclear reactor. In particular, the invention relates to a method for manufacturing fuel channels made from metal alloy, such as zirconium-based alloy.

BACKGROUND OF THE INVENTION

A boiling water reactor (BWR) has nuclear fuel assemblies comprising bundles of fuel rods made of fissionable materials capable of releasing a finite number of neutrons. Neutrons are released due to fission at high speed and then moderated by the water to a lower speed at which the neutrons can produce a chain reaction of fission events. Each fuel assembly is surrounded by a fuel channel made of metal which parasitically absorbs neutrons. To minimize parasitic absorption of neutrons, fuel channels are typically fabricated from a metal alloy known as Zircaloy, which absorbs very few thermal neutrons, i.e., has a low absorption cross section. Zircaloy is an alloy of zirconium with small amounts of iron, tin and other alloy metals. In particular, Zircaloy-2 contains about 1.5% tin, 0.15% iron, 0.1% chromium, 0.05% nickel and 0.1% oxygen, whereas Zircaloy-4 contains substantially no nickel and about 0.2% iron but otherwise is similar to Zircaloy-2.

Fuel channels are hollow elongated components of generally square cross section, which may measure approximately 6 inches on each side and on the order of 14 feet in length. Typically, the channels are created by rolling strips of Zircaloy, bending the strips into U-shaped channel sections and then seam welding two U-shaped channel sections together to form a single fuel channel. Reactor control occurs typically on the exterior of such fuel channels. To optimize nuclear reactor control, the fuel channels are formed with flat sides which conform to the shapes of the control rods.

The fuel channels also serve the purpose of confining the coolant water flowing through the nuclear core to a predictable flow path around the steam-generating fuel rods. To assure predictable water flow in the reactor, there is a pressure differential between the inside and the outside of the fuel channels. The water flowing inside the fuel channel is turned into steam by the heat released during fission. The outside of the fuel channel constitutes a different pressure environment.

The planar fuel channel walls are connected by corners and tend to bulge responsive to the pressure differential. This tendency to bulge is additionally aggravated by thermal effects and also by radiation. In-reactor dimensional changes of a fuel channel are primarily a result of: 1) stress relaxation of manufacturing-induced stresses; 2) radiation-induced growth; and 3) radiation-enhanced creep. The radiation-induced growth can lead to dimensional changes such as longitudinal bow if the channel strip contains variations in crystallographic texture and resides in a region with neutron flux gradients. In particular, conventional fuel channels having a uniform crystallographic texture, i.e., $f_L \approx 0.10$ everywhere in the fuel channel, will bow in a flux gradient.

Irradiation also decreases the ductility and increases embrittlement of the Zircaloys. The magnitude of the radiation effect is partly dependent on the microstructure (or "texture") of the alloy. Because the hexagonal close-packed phase in the Zircaloys is anisotropic, different fabrication processes will yield products with different textures. Therefore, the radiation embrittlement of Zircaloy is dependent on its fabrication history.

Since in-reactor dimensional stability and corrosion resistance are important attributes of a BWR fuel channel, it is imperative that these fuel channels be manufactured to the proper dimensions and be free of geometric irregularities, such as face or side bulge, out-of-square cross section, non-parallelism of sides, longitudinal bow and twist, and the like. However, the channel creating step leaves residual manufacturing stresses which lead to geometric irregularities. Therefore, it is conventional practice to subject fuel channels to thermal sizing to eliminate these stresses.

The use of thermal sizing is well established in the fabrication of precisely dimensioned components and in various other processes. This technique takes advantage of differences in the coefficients of thermal expansion of different metals. An elongated, close-fitting mandrel having a coefficient of thermal expansion greater than that of the component to be sized is inserted into the component. This assembly of the component and mandrel is then heated to a temperature of about 1100° F. in an inert atmosphere, e.g., in a vacuum or in an inert gas such as argon. As the mandrel expands at a greater rate than the component, the former plastically deforms the latter to the desired dimensions while relieving manufacturing stresses. The assembly is then cooled and the mandrel is removed. Thermal sizing techniques are disclosed in U.S. Pat. No. 4,989,433 to Harmon et al. and U.S. Pat. No. 4,604,785 to Eddens, both assigned to the assignee of this patent application, and in U.S. Pat. No. 3,986,654 to Hart et al. The contents of these patents are incorporated by reference herein.

High corrosion resistance for the Zircaloys is conventionally obtained by heating the channel material to an elevated temperature followed by fast quenching, e.g., by inductive heating and water quenching. For Zircaloy-2 the process involves quenching at an intermediate slab thickness and controlling subsequent thermal exposure during strip manufacture.

Such a heat treatment is disclosed in U.S. Pat. No. 4,238,251 to Williams et al, assigned to the assignee of this patent application and the contents of which are incorporated herein by reference. This patent discloses that in components made of zirconium-based alloys, a strong correlation exists between a particular microstructural characteristic and resistance to accelerated pustular corrosion in BWR environments. That characteristic can be produced by heating to redistribute the intermetallic particulate phase [$Zr(Cr,Fe)_2$ in Zircaloy-4 and $Zr(Cr,Fe)_2$, $Zr_2(Ni,Fe)$ in Zircaloy-2] in a pattern which imparts the desired corrosion resistance characteristic to the metal. U.S. Pat. No. 4,238,251 teaches that the service life of a zirconium-base alloy component can be greatly increased by heating the component to initiate transformation from alpha (hexagonal close-packed) to beta (body-centered cubic) phase, and then quenching to a temperature substantially below the phase transformation temperature range. While transformation of the alpha phase to the beta phase begins at about 825° C., a somewhat higher temperature, e.g., 870° C., was preferred. Segregation of precipitate particles is obtained to the desired extent by quenching after only a few seconds in the transformation temperature range down to below 700° C.

U.S. Pat. No. 4,238,251 further discloses that rapid cooling enhances the corrosion properties of fuel channels in service in BWRs, without degrading physical properties in general and creep strength and ductility in particular. Preferably, this cooling step involves quenching the component at a rate of at least about 20° C. per second.

Thus, conventional processing techniques use thermal sizing to reduce manufacturing stress or controlled thermal treatment to impart the required corrosion resistance. Considerable effort is also invested in providing what is known in the industry as matched pairs to reduce crystallographic texture variation and minimize differential irradiation growth within channels. However, it has not been known to provide a dimensionally stable and corrosion-resistant fuel channel by subjecting the channel to both heat treatment and thermal sizing.

SUMMARY OF THE INVENTION

The present invention improves upon conventional methods for manufacturing components made of zirconium-based alloy by combining heat treatment with thermal sizing to produce a component ideally having a random crystallographic texture, i.e., $f_L = f_N = f_T \approx 0.33$, everywhere in the fuel channel, where $f_L$, $f_N$, $f_T$ are the fractions of hexagonal crystals having basal poles which are generally oriented parallel to the longitudinal, normal and transverse directions respectively. (For strip, the longitudinal direction is the rolling direction and the normal direction is perpendicular to the plane of the strip. For tubing, the longitudinal direction is along the axis of the tube, the normal direction is the radial direction and the transverse direction is the circumferential direction.)

In practice, the benefits of the invention are obtained without the need for random texture provided that $f_L$ is high, i.e., $f_L = 0.28-0.38$. Zirconium-based alloys having a high-$f_L$ crystallographic texture in accordance with the invention form components having improved dimensional stability and excellent reactor corrosion resistance.

In accordance with the invention, the method of manufacturing components of zirconium-based alloy comprises a heat treatment step and at least one thermal sizing step. Preferably, the thermal sizing is performed twice: before and after the heat treatment.

The first thermal sizing comprises heating the component to a temperature less than the heat treatment quench temperature, but sufficient to anneal the component, and then cooling. This thermal sizing eliminates manufacturing stresses and ensures accurate size control to facilitate well-controlled heat treatment.

The heat treatment comprises heating the component to a temperature which initiates transformation from a hexagonal close-packed phase to a body-centered cubic crystallographic phase and then quenching (using gas or water) to a quench temperature at a rate which initiates transformation to a high-$f_L$ crystallographic phase. The rapid quenching imparts good corrosion resistance.

Heat treatment is followed by a second thermal sizing. Again the component is heated to a temperature less than the heat treatment quench temperature, but sufficient to anneal the component, and then cooled. The second thermal sizing eliminates quenching stresses and imparts the desired final channel dimensions.

This processing will result in improved in-reactor dimensional stability by eliminating manufacturing stresses, reduced in-reactor growth due to the texture randomization, and improved nodular and uniform corrosion resistance. The method is especially suited for the manufacture of fuel channels made from Zircaloy for a BWR. However, the method could also be used to make nuclear fuel cladding, fuel rod spacers for use in a fuel channel or any other component made from zirconium-based alloy.

DETAILED DESCRIPTION OF THE PREFERRED EMBODIMENTS

The method of manufacturing a fuel channel of a zirconium-based alloy for a BWR in accordance with the preferred embodiment of the invention comprises three steps performed in the following sequence: (1) thermal sizing to eliminate manufacturing stresses and ensure accurate size control to facilitate well-controlled heat treatment; (2) heat treatment (heating and quenching) to impart excellent corrosion resistance and to randomize the crystallographic texture; and (3) thermal sizing to eliminate quenching stresses and obtain the desired final dimension of the component.

In the first thermal sizing, a conventional mandrel consisting of a material with a thermal coefficient of thermal expansion larger than that of the zirconium-based alloy is inserted into the fuel channel. The mandrel has geometric dimensions slightly smaller than the final dimensions of the fuel channel. The mandrel/fuel channel assembly is then heated to a temperature of 1000° F. to 1250° F., held in this temperature range for a time duration of 15 min to 10 hr and then cooled. After cooling, the mandrel is removed from the fuel channel.

It is critical to avoid contamination of the Zircaloy surface and the formation of oxides and nitrides thereon during thermal sizing. Due to the high reactivity of Zircaloy with oxygen and nitrogen, the fuel channel is preferably protected from extensive oxidation during thermal sizing by an inert gas medium or by enclosing the channel/mandrel assembly in a vacuum system.

After thermal sizing, the fuel channel undergoes high-temperature heat treatment. The heat treatment is carried out utilizing a conventional induction heating coil, preferably in a vacuum. The fuel channel is heated to a temperature of 1800° F. or greater (with a practical upper temperature limit of 2050° F.) and held at a temperature equal to or greater than 1800° F. for a minimum of 3 seconds. The purpose of this high-temperature heating is to induce a full transformation of the crystalline structure of the zirconium-based alloy of the fuel channel from the alpha phase (hexagonal close-packed) to the beta phase (body-centered cubic).

After the fuel channel has been maintained at a temperature equal to or greater than 1800° F. for a time duration equal to at least the minimum, i.e., 3 seconds, the fuel channel is quenched with a fluid to a temperature of 1400° F. or less at a rate of at least 36° F./sec. The preferred quenching fluid is an inert gas such as helium, rather than water, which is prone to contain contaminants such as dissolved $O_2$.

During quenching, the crystallographic structure of the structure of the zirconium-based alloy is transformed from the beta phase back to the alpha phase, except that the rapid quenching produces grains of alpha phase having a high-$f_L$ crystallographic texture. In particular, the structure of the zirconium-based alloy obtains a high-$f_L$ crystallographic orientation with a texture factor approximately equal to ⅓, i.e., $f_L = f_N = f_T \approx 0.33$, thereby developing the dimensionally stable fabricated fuel channel. The rapid cooling rate (>36° F./sec) is required to yield a highly corrosion-resistant material.

After heat treatment, the fuel channel undergoes a second thermal sizing. In this thermal sizing, again a conventional mandrel consisting of a material with a thermal coefficient of thermal expansion larger than that of the zirconium-based alloy is inserted into the fuel channel. However, this mandrel has geometric dimensions slightly larger than the mandrel used in the first thermal sizing and corresponding to the final dimensions of the fuel channel. The mandrel/fuel channel assembly is then heated to a temperature of 1000° F. to 1250° F., held in this temperature range for a time duration of 15 min to 10 hr and then cooled. This thermal sizing is again preferably carried out in an inert gas atmosphere or in a vacuum to minimize oxidation of the Zircaloy surface. After cooling, the mandrel is removed from the fuel channel.

The total cycle time for the process is about 5 hours with the maximum time spent by the fuel channel at a temperature above 932° F. being about 4 hours. The resulting fuel channel has a fully annealed (no internal stresses) high-$f_L$ crystallographic structure and precise dimensions. The fuel channel is thereafter subjected to a combination of chemical and mechanical surface conditioning steps, e.g., chemical etching and grit blasting, to remove oxides.

Zircaloy BWR fuel channels manufactured according to the above-prescribed processing limits will exhibit excellent corrosion resistance and a high-$f_L$ crystallographic texture that provides in-reactor dimensional stability. The method is especially suited for the manufacture of fuel channels made from Zircaloy for a boiling water reactor. However, the method could also be used to make nuclear fuel rod spacers for use in a fuel channel or any other component made from zirconium-based alloy. Moreover, the product by process of the present invention is not limited to components made from zirconium-based alloy. On the contrary, the invention encompasses any component made from a metal which can be heated to a body-centered cubic (beta) phase, then quenched to a hexagonal close-packed (alpha) phase having high-$f_L$ crystallographic texture and subsequently annealed.

The preferred method when applied to fuel channels made from zirconium-based alloy includes two thermal sizing steps. The initial thermal sizing makes the processing easier, especially with regard to fit up of the mandrel and fuel channel. In addition, the initial thermal sizing will allow for better heat treatment control by providing a fuel channel which is stress relieved prior to heat treatment and is thus not prone to distortion during heat treatment driven by relief of pre-existing stresses.

However, although the preferred method has been disclosed with separate thermal sizings before and after heat treatment, the utilization of only a single thermal sizing, either before or after the heat treatment, would produce some benefit, especially in applications where the component can have less precise dimensions or need not be fully annealed.

These and other variations and modifications of the disclosed preferred embodiment will be readily apparent to practitioners skilled in the art of nuclear reactor engineering. All such variations and modifications are intended to be encompassed by the claims set forth hereinafter.

We claim:

1. A method for manufacturing a dimensionally stable and corrosion-resistant component, comprising the steps of:
    forming said component from a material comprising metal alloy in a hexagonal close-packed crystallographic phase having a uniform texture;
    subjecting said component to heat treatment by heating to a first temperature which initiates transformation from said hexagonal close-packed crystallographic phase to a body-centered cubic crystallographic phase and then quenching to a second temperature at a rate which initiates transformation to a hexagonal close-packed crystallographic phase having a texture factor $f_L = 0.28$–$0.38$; and
    subjecting said component to thermal sizing by heating to a third temperature less than said second temperature and sufficient to anneal said material and then cooling.

2. The method as defined in claim 1, wherein said thermal sizing step is performed before said heat treatment step.

3. The method as defined in claim 1, wherein said thermal sizing step is performed after said heat treatment step.

4. The method as defined in claim 2, wherein a second thermal sizing step is performed after said heat treatment step and includes the steps of heating said component to a fourth temperature less than said second temperature and then cooling, said fourth temperature being sufficient to anneal said material.

5. The method as defined in claim 1, wherein said first temperature is no less than 1800° F., said component is held at a temperature no less than said first temperature for at least 3 seconds and said second temperature is no more than 1400° F.

6. The method as defined in claim 5, wherein said quenching occurs at a rate of at least 36° F./sec.

7. The method as defined in claim 1, wherein said third temperature is in a temperature range of 1000° F. to 1250° F. and said component is held at a temperature no less than said third temperature for 15 minutes to 10 hours before cooling.

8. A method for manufacturing a dimensionally stable and corrosion-resistant component, comprising the steps of:
    subjecting said component to heat treatment by heating to a first temperature of no less than 1800° F., holding at a temperature no less than said first temperature for a first predetermined time duration and then quenching to a second temperature equal to no greater than 1400° F.; and
    subjecting said component to thermal sizing by heating to a third temperature in a temperature range of 1000° F. to 1250° F., holding at a temperature no less than said third temperature for a second predetermined time duration and then cooling.

9. The method as defined in claim 8, wherein said thermal sizing step is performed before said heat treatment step.

10. The method as defined in claim 8, wherein said thermal sizing step is performed after said heat treatment step.

11. The method as defined in claim 8, wherein said first predetermined time duration is at least 3 seconds.

12. The method as defined in claim 8, wherein said second predetermined time duration is 15 minutes to 10 hours.

13. The method as defined in claim 8, wherein said quenching occurs at a rate of at least 36° F./sec.

14. A dimensionally stable and corrosion-resistant component made of metal alloy having a hexagonal close-packed crystallographic phase which is stable in a first temperature range and a body-centered cubic crystallographic phase which is stable in a second temperature range different than said first temperature range, formed by the steps of:

subjecting said component to heat treatment by heating to a first temperature which initiates transformation from a hexagonal close-packed crystallographic phase having a uniform texture to a body-centered cubic crystallographic phase and then quenching to a second temperature at a rate which initiates transformation to a hexagonal close-packed crystallographic phase having a texture factor $f_L=0.28-0.38$; and subjecting said component to thermal sizing by heating to a third temperature less than said second temperature and then cooling, said third temperature being sufficient to anneal said component.

15. The component as defined in claim 14, wherein said thermal sizing step is performed before said heat treatment step.

16. The component as defined in claim 14, wherein said thermal sizing step is performed after said heat treatment step.

17. The component as defined in claim 14, wherein said metal alloy is zirconium-based alloy.

18. The component as defined in claim 14, wherein said component is a fuel channel for a nuclear reactor.

19. The component as defined in claim 14, wherein said first temperature is no less than 1800° F., said component is held at a temperature no less than said first temperature for at least 3 seconds, said second temperature is no more than 1400° F. and said quenching occurs at a rate of at least 36° F./sec.

20. The component as defined in claim 14, wherein said third temperature is in a temperature range of 1000° F. to 1250° F. and said component is held at a temperature no less than said third temperature for 15 minutes to 10 hours before cooling.

* * * * *